United States Patent [19]

Higgins

[11] 4,046,589

[45] Sept. 6, 1977

[54] CALCIUM-SILICO-ZIRCONATE PRIMER PIGMENT

[75] Inventor: James Francis Higgins, Livingston, N.J.

[73] Assignee: E. I. Du Pont de Nemours and Company, Wilmington, Del.

[21] Appl. No.: 726,292

[22] Filed: Sept. 24, 1976

[51] Int. Cl.$^2$ .............................................. C09C 1/28
[52] U.S. Cl. ................................ 106/299; 106/288 B; 106/306; 106/14
[58] Field of Search .................. 106/299, 306, 288 B, 106/14

[56] References Cited

U.S. PATENT DOCUMENTS

| | | | |
|---|---|---|---|
| 3,004,857 | 10/1961 | Merson et al. | 106/292 |
| 3,072,495 | 1/1963 | Petrot | 106/296 |
| 3,085,893 | 4/1963 | Buchman et al. | 106/299 |
| 3,850,732 | 11/1974 | Binns | 106/14 |
| 3,923,674 | 12/1975 | Shannon | 106/14 |

Primary Examiner—Winston A. Douglas
Assistant Examiner—J. V. Howard

[57] ABSTRACT

A method of imparting corrosion-inhibition to a primer by incorporating in the primer from 0.1% to 65% by weight of calcium-silico-zirconate. The resulting primer provides a high level of corrosion-resistance when applied to metal substrates.

2 Claims, No Drawings

CALCIUM-SILICO-ZIRCONATE PRIMER PIGMENT

BACKGROUND OF THE INVENTION

This invention relates to primer paints and, particularly to a method of imparting corrosion-inhibition to metal primers.

Corrosion is an electrochemical phenomenon in which a metal in its elementary form is converted to a compound, usually an oxide. The presence of materials such as chlorides, sulfates, and sulfides, even in very small amounts, can greatly accelerate corrosion of a metal substrate. Since metallic structures can be exposed to conditions ranging from total immersion in fresh or salt water to atmospheres high in humidity or chemical impurities, a protective coating composition, i.e., a primer, specially formulated for its ability to inhibit corrosion of the metal substrate is generally applied. Since no primer will protect against corrosion equally well under all circumstances, the choice of pigment and vehicle which make up the primer depends primarily on the proposed application.

A variety of pigments are known in the art for their ability to inhibit corrosion of metal substrates when applied to the substrate in a primer. The most commonly used corrosion-inhibitive pigments include zinc yellow ($4ZnO.4CrO_3.K_2O.3H_2O$), basic zinc chromate ($5ZnO.CrO_3.4H_2O$), strontium chromate ($SrCrO_4$), zinc oxide (ZnO), red lead ($Pb_3O_4$), basic lead chromate ($PbO.PbCrO_4$), basic lead silicochromate ($PbO.PbCrO_4 + SiO_2$) and zinc dust (Zn).

Although each of these corrosion inhibitive pigments has been found to have some value in use, in some cases there have been difficulties in their production and large scale commercialization. None of the pigments disclosed in the prior art has been completely satisfactory in all respects, although zinc yellow is generally considered the most versatile and is the most widely used. Other problems associated with many of the known pigments include high materials cost and manufacturing costs, the irritating and toxic effects of certain of the chemicals comprising the pigments, the unstable nature of the pigments in film forming media, the lack of color stability upon exposure to sun and weathering, and the reactivity of the pigment with the film forming material to effect breakdown of the film.

This invention provides for an economic method for imparting corrosion-inhibition to primers by incorporating therein an inexpensive inorganic pigment which generally exhibits higher corrosion-inhibition than zinc yellow and can be manufactured on a commercial scale in a substantially pollution free manner.

SUMMARY OF THE INVENTION

In accordance with the invention there is provided a method of imparting corrosion-inhibition to a primer by incorporating therein from 0.1% to 65% by weight of calcium-silico-zirconate, based on the weight of the primer.

The calcium-silico-zirconate utilized as a corrosion-inhibitive pigment is a physio-chemical composition of the formula $xCaO.SiO_2.ZrO_2$, wherein $x$ is from 2.75 to 3, resulting from the calcination of zircon, i.e., zirconium silicate, $ZrSiO_4$, with calcium oxide (CaO) or limestone ($CaCO_3$) at temperatures from 1400° C. to 1500° C.

DETAILED DESCRIPTION OF THE INVENTION

In the processing of zircon to produce zirconium oxide, it is common practice to calcine a mixture of zircon and limestone at temperatures up to about 1500° C., pelletize the calcined mixture, and acid leach basic materials from the pellets so that zirconium oxide remains. Applicant finds that when the step of acid leaching is eliminated the resulting product is calcium-silico-zirconate of the formula $xCaO.SiO.ZrO_2$ which is particularly useful as a corrosion-inhibitive pigment in primers. The calcium-silico-zirconate can equally well be prepared using CaO in place of the limestone, because at elevated temperatures limestone decomposes to CaO and $CO_2$, which leaves the reaction as a gas.

The calcium-silico-zirconate can conveniently be prepared by charging a conventional rotary kiln with particulate zirconium silicate and particulate calcium oxide preferably in amounts sufficient to provide a mole ratio of $CaO:ZrSiO_4$ of 3:1, heating to a temperature from 1400° C. to 1500° C., preferably 1450° C., for one to three hours and cooling the calcined product, e.g., in air. If the particle size of the resulting calcium-silico-zirconate is too large for pigmentary use in primers, the product can be milled or ground to pigmentary size in the conventional manner, e.g., ball milling, without adversely affecting the performance properties of the calcium-silico-zirconate in a nonaqueous primer composition. Calcium-silico-zirconate can be used in aqueous or nonaqueous, i.e., organic primers, but is preferred for use in organic primers.

The formulation of primers is well known to those skilled in the art and calcium-silico-zirconate can be utilized in the conventional range of primer compositions in the same way that zinc yellow is utilized. That is, calcium-silico-zirconate can be utilized as a direct substitute for zinc yellow in primer formulations.

Generally primer formulations contain an organic film-forming vehicle, such as alkyd resin, diluent, such as water in aqueous primers and organic liquid in nonaqueous or organic primers, and pigment. The pigment component of the primer can consist of one or more of a wide variety of extender pigments, colored pigments, and specialty pigments depending on the desired economy, color performance and properties of the primer. Corrosion-inhibitive primers generally contain from 0.1% to 65% by weight of the corrosion-inhibitive pigment, based on the weight of the primer and that is the amount of calcium-silico-zirconate which is recommended for use to impart sufficient corrosion-inhibition to the primer.

Extender pigments are well known in the art and are selected from silaceous materials, such as silica and inorganic silicates and auxiliary pigments. Auxiliary pigments are durable pigments lacking corrosion-inhibitive power in themselves, but useful in conjunction with corrosion inhibitive pigments to, for example, impart a particular color to the primer. Typical auxiliary pigments include iron oxide ($Fe_2O_3$), titanium dioxide ($TiO_2$), magnesium silicate ($MgSiO_3$), and aluminum flake (Al).

The organic film-forming vehicle conventionally consists of oil-modified phenol-aldehyde resins and alkyd resins. Small quantities, i.e., less than 1% by weight, of organic driers, such as lead or cobalt naphthenate, can also be present in the organic vehicle. Typical organic diluents include hydrocarbons, alcohols, aldehydes, esters, ethers, ketones having an olefinic or cycloolefinic type of unsaturation, and aromatic compounds with seven or more carbon atoms to the molecule, such as xylene and toluene.

Within the framework of the above definition of a general primer, particular primers are formulated in accordance with the end use. For example, typical marine primers should contain a relatively high amount of corrosion-inhibitive pigment, e.g., at least 60% by weight based on the total pigment and durable synthetic organic vehicles such as alkyd resins. Structural steel primers for nonmarine use and industrial primers are generally subjected to conditions considerably less severe than marine primers and less corrosion-inhibitive pigment is needed and some raw linseed oil can be used in the vehicle. In fact, a definite portion of raw linseed oil is usually desirable to promote penetration on the rusted surfaces that are frequently encountered in structural work. A typical structural primer can contain about 40% by weight of corrosion-inhibitive pigment and a vehicle consisting of 50% by weight of long oil alkyd solids and 50% by weight of raw linseed oil. Nonaqueous primers for aluminum and aluminum alloys can be formulated according to current military specifications for zinc yellow, wherein calcium-silico-zirconate should be substituted for zinc yellow.

DESCRIPTION OF THE TEST

To test the corrosion-inhibitive property of the calcium-silico-zirconate and control pigment a marine-primer paint was prepared for each pigment, sprayed on test panels, and exposed to a salt fog.

The marine-primer paint was prepared by milling a mixture of 138.1 g. of calcium-silico-zirconate, 172.6 g. of fibrous talc, 204.0 g. of a 50% solids alkyd resin dispersion and 213.4 g. of mineral spirits. After milling, the mixture was reduced with 132.0 g. of a 50% solids alkyd resin dispersion, 32.6 g. of mineral spirits, 7.0 g. of a lead naphthenate drier (24%), and 2.2 g. of a cobalt naphthenate drier (6%). The same marine-primer paint was prepared as a control except that 390.6 g. of zinc yellow was used instead of 138.1 g. of calcium-silico-zirconate so that each marine-primer paint had the same pigment volume concentration.

Each primer was applied to a zinc phosphate treated steel panel to a dry film thickness of 1.1 mils (0.028 millimeters) and an X was scribed on each panel. The panels were exposed at a temperature from 92° F. to 97° F. (33° C. to 36° C.) to a salt fog of 5% by weight of sodium chloride in distilled water for 180 hours, and 500 hours. The panels were examined for general appearance and rust growth, i.e., corrosion, and rated from 0 to 10. A rating of 10 indicates no change and a rating of 0 indicates complete failure.

The following example illustrates the invention.

EXAMPLE

One hundred eighty-three grams of zirconium silicate and 168 g. of calcium oxide were dry mixed and placed in an oven and heated to 1450° C. for three hours. the calcined product was air cooled and micropulverized to yield 336 g. of a product having the formula $3CaO.SiO_2.ZrO_2$.

The calcium-silico-zirconate prepared above was incorporated in the marine-primer paint and tested as described above relative to a commercially available zinc yellow. The results are summarized in the Table.

TABLE

| Pigment | Corrosion-Resistance | | | | | |
|---|---|---|---|---|---|---|
| | 180 hrs. | | 360 hrs. | | 500 hrs. | |
| | G* | S** | G* | S** | G* | S** |
| $3CaO.SiO_2.ZrO_2$ | 7.5 | 8.8 | 6.5 | 7.8 | 7.0 | 7.5 |
| zinc yellow (control) | 6.5 | 7.0 | 5.0 | 5.8 | 6.5 | 3.8 |

*General Appearance
**Rust Growth on Scribed Portion

In addition to the superior corrosion-resistance of panel coated with the marine primer containing $3CaO.SiO_2.ZrO_2$, it was noted that the zinc yellow coated panel blistered severly and no blistering was noted on the $3CaO.SiO_2.ZrO_2$ panel.

What is claimed is:

1. A method of imparting corrosion-inhibition to a primer by formulating into the primer from 0.1% to 65% by weight of calcium-silico-zirconate of the formula $xCaO.SiO_2.ZrO_2$, wherein $x$ is from 2.75 to 3, based on the weight of the primer.

2. A corrosion-inhibitive primer formulation consisting essentially of an organic film-forming vehicle, diluent and pigment, wherein calcium-silico-zirconate of the formula $xCaO.SiO_2.ZrO_2$, wherein $x$ is from 2.75 to 3, is present in an amount from 0.1% to 65% by weight, based on the weight of the primer formulation.

* * * * *